United States Patent
Hagel et al.

(10) Patent No.: US 7,725,248 B2
(45) Date of Patent: May 25, 2010

(54) METHOD FOR OPERATING AN INTERNAL COMBUSTION ENGINE

(75) Inventors: Reinhold Hagel, Pinzberg (DE); Mehmet Tuna, Fuerth (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 507 days.

(21) Appl. No.: 11/662,295

(22) PCT Filed: Jul. 27, 2005

(86) PCT No.: PCT/DE2005/001341

§ 371 (c)(1), (2), (4) Date: Mar. 8, 2007

(87) PCT Pub. No.: WO2006/029586

PCT Pub. Date: Mar. 23, 2006

(65) Prior Publication Data

US 2008/0281498 A1  Nov. 13, 2008

(30) Foreign Application Priority Data

Sep. 17, 2004  (DE) ........................ 10 2004 045 215

(51) Int. Cl.
G06F 19/00 (2006.01)
F02M 51/00 (2006.01)

(52) U.S. Cl. .................. 701/115; 123/478; 123/674

(58) Field of Classification Search .............. 123/478, 123/480, 674, 675; 701/103, 114, 115
See application file for complete search history.

(56) References Cited

U.S. PATENT DOCUMENTS

| | | | | |
|---|---|---|---|---|
| 5,063,510 A | | 11/1991 | Jürgens et al. | |
| 5,267,546 A | * | 12/1993 | Siebert et al. | 123/500 |
| 5,692,052 A | * | 11/1997 | Tanaka et al. | 381/71.9 |
| 5,713,332 A | | 2/1998 | Adler et al. | |
| 6,397,112 B1 | | 5/2002 | Coatesworth | |
| 6,405,122 B1 | * | 6/2002 | Yamaguchi | 701/106 |
| 6,745,743 B2 | * | 6/2004 | Abo et al. | 123/295 |

(Continued)

FOREIGN PATENT DOCUMENTS

DE  38 25 749  3/1990

(Continued)

*Primary Examiner*—John T Kwon
(74) *Attorney, Agent, or Firm*—W. F. Fasse; W. G. Fasse

(57) ABSTRACT

The procedure is used for the operation of an internal combustion engine (1) with several cylinders (2, 3, 4, 5) into each of which fuel is injected. For a current operating point (15), the current correction factor ($K_M$) for the injection into one of the cylinders (2, 3, 4, 5) is determined. Using the current correction factor ($K_M$) at least some of the grid correction factors ($K_{GA}$) which are stored in a correction factor characteristic map (13) for discrete operating points (16) of the internal combustion engine (1) are adapted. Here, a distance between the current operating point (15) and the discrete operating point of the grid correction factor ($K_{GA}$) currently to be adapted is taken into account during the adaptation of the grid correction factors ($K_{GA}$). Using updated grid correction factors ($K_{GN}$) which are stored following adaptation in the correction factor characteristic map (13), an updated correction factor ($K_{MN}$) is determined for the current operating point (15) and used for the injection.

11 Claims, 2 Drawing Sheets

U.S. PATENT DOCUMENTS

2005/0229904 A1    10/2005    Hagel et al.

FOREIGN PATENT DOCUMENTS

| DE | 43 04 441   | 8/1994  |
| DE | 44 18 731   | 11/1995 |
| DE | 44 34 455   | 3/1996  |
| DE | 100 44 412  | 3/2002  |
| DE | 102 35 665  | 2/2004  |
| JP | 62-121846   | 6/1987  |
| JP | 2001-207895 | 8/2001  |

* cited by examiner

METHOD FOR OPERATING AN INTERNAL COMBUSTION ENGINE

FIELD OF THE INVENTION

The invention relates to a method of operating an internal combustion engine with a correction of a current or present operating point of the fuel injection into one of the cylinders of the engine.

BACKGROUND INFORMATION

A procedure or method according to the above general field is known from DE 102 35 665 A1. Depending on the current operation condition of the internal combustion engine, a cylinder-specific correction factor is calculated, based on which the quantity and the point in time of the fuel to be injected into this cylinder are determined. The procedure described is well suited to regulating the quiet running of the internal combustion engine. Aging effects, which are noticeable in particular with frequently recurring operating conditions (=operating points) of the internal combustion engine can be well stabilized in a cylinder-specific manner. However, the procedure requires improvement with regard to operating conditions which occur rarely.

SUMMARY OF THE INVENTION

The object of the invention is therefore to provide a procedure of the general type or field discussed above, by means of which a secure and efficient operation of the internal combustion engine is possible, even with operating conditions which occur only rarely.

The above object has been achieved according to the invention in a method or procedure of the type generally discussed above. A current operating point is defined by two condition values of the engine, preferably using a rotational speed signal measured from a shaft of the engine. A current correction factor is determined for the fuel injection into one of the engine's cylinders for the current operating point. Additionally, correction factors forming a grid of the two condition values are stored in a correction factor characteristic map. In the correction factor characteristic map, not only the grid correction factor which is provided directly for the current operating point is adapted, but also further grid correction factors which are provided for discrete operating points, at least within a certain field surrounding the current operating point. The distance from the current operating point, within which the adaptation of the grid correction factors is conducted, can be selected according to requirements. Here, both extreme cases are also possible, in which either only the grid correction factors of the immediately adjacent discrete operating points or all grid correction factors are adapted. The procedure according to the invention guarantees that grid correction factors of discrete operating points in which the internal combustion engine is seldom or in extreme cases even never operated, are also adapted when, with more frequently occurring operating points, an altered behavior of the internal combustion engine or at least of the affected cylinder is detected. If the internal combustion engine then reaches such a rare operating point for the first time, for example, the corresponding grid correction factor can, due to the interaction described, have already been adapted to an altered behavior, however. With the procedure according to the invention, information which is obtained with frequently occurring operating conditions is also accessed for rare operating conditions. As a result, a secure and efficient operation of the internal combustion engine is achieved even with operating conditions which occur rarely.

In a particular variant embodiment of the invention, a correction factor or frequency is interpolated using grid correction factors adjacent to the current operating point. Thereby the method remains functional even when the current operating point is not precisely the same as one of the discrete operating points of the correction factor and frequency characteristic map. The difference between the current correction factor and the interpolated correction factor also leads to a type of low-pass filtering or integration of the current correction factor. Very strong and volatile changes in the current correction factor are thus only partially taken into account, and with a certain delay. This contributes to the stability of the procedure.

If According to another embodiment, the frequency of the current operating point and the grid frequency of the discrete operating point are taken into account. Thereby a disproportionately high influence of operating conditions which occur only rarely can be avoided. Frequently occurring operating conditions are given greater significance, by contrast, since the information content of the corresponding (grid) correction factor comprises very high statistical reliability due to the frequent occurrence, and is largely independent of coincidentally extreme fluctuation. Due to the fact that the degrees of frequency are taken into account, the reliability of the procedure is increased overall.

Another feature ensures that both the stored grid correction factors and the stored frequency factors are maintained in each case at the most current status possible, in that both the grid frequencies as well as the grid correction factors of each of the discrete operating points are undated in the same adaptation cycle.

Another variant of the invention provides an excess correction of the updated grid frequencies, whereby it is prevented that a grid frequency reaches a maximum numerical value specified by the hardware and/or software version, and can then no longer be raised further, as a result of which at least the frequency analysis and in some cases even the entire procedure may operate in an erroneous manner or fail completely.

Initially, a uniform value may be assigned to the grid correction factors. This makes defined conditions possible from the beginning, so that the procedure also works error-free even when a stored discrete operating condition is accessed for the first time.

In an optional further embodiment, the distance between the current operating point and the discrete operating point of the grid correction factor that is currently to be adapted is weighted. Thereby, the distant effect of a current correction factor determined for the current operating condition can be set to the grid correction factors and the grid frequencies of the current discrete operating points with an even higher degree of adjustment. In particular, the influence reduces with increasing distance from the current operating point. The weighting is achieved for example using a constant multiplicative weighting factor. It can however also contain a functional dependency, in particular an exponential dependency, from the distance.

Further inventive embodiments provide equations defining the suitable adaptation of the grid correction factors and the grid frequencies, which enable a simple and also easy-to-realize adaptation of the grid correction factors or grid frequencies.

BRIEF DESCRIPTION OF THE DRAWINGS

Further features, advantages and details of the invention shall now be described below with reference to an exemplary embodiment based on the drawings, in which.

DETAILED DESCRIPTION OF AN EXAMPLE EMBODIMENT OF THE INVENTION

Figure 1:
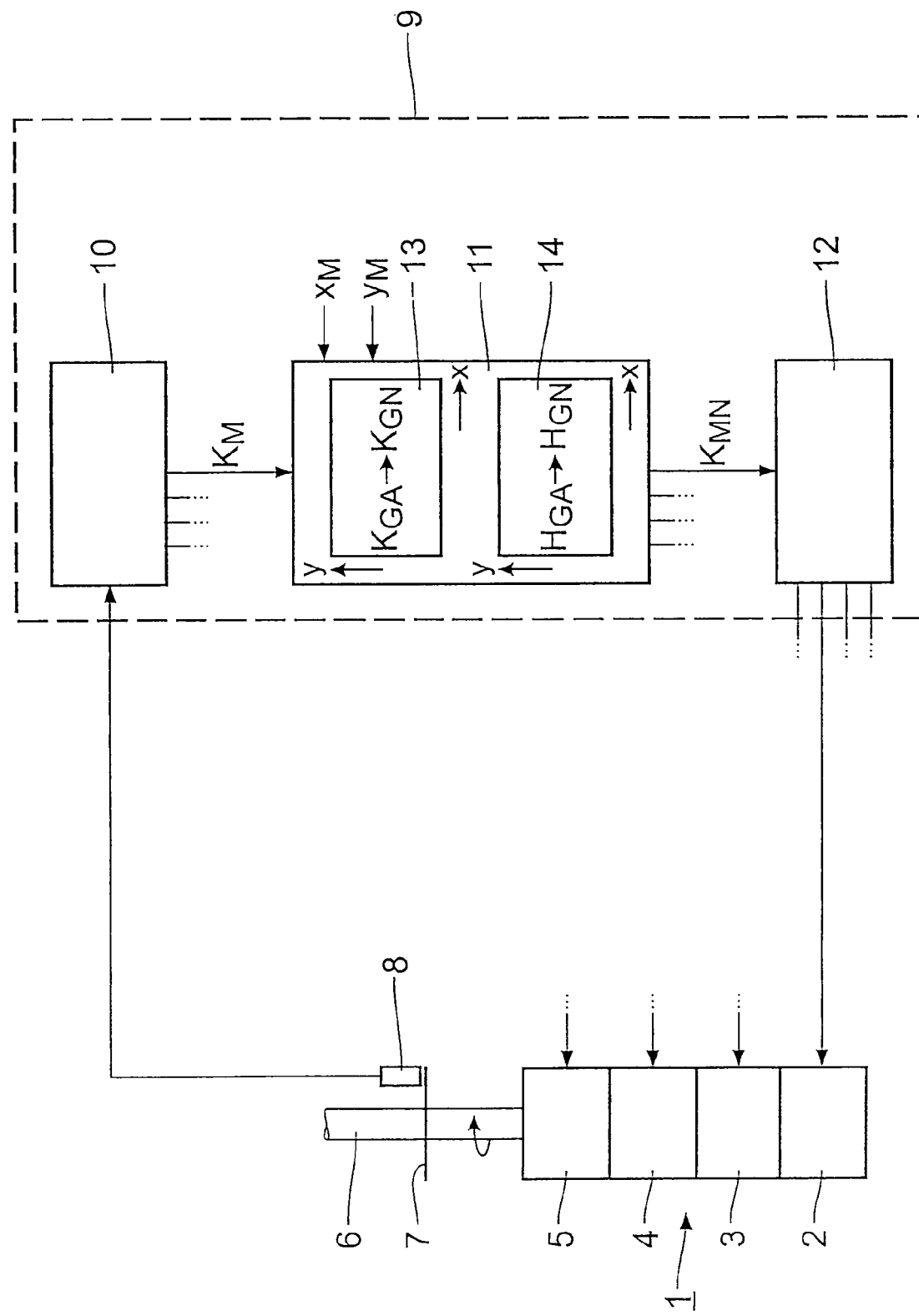
FIG. 1 shows an internal combustion engine which can be operated using a control device, whereby the control device comprises a characteristic map unit with an adaptable correction factor characteristic map and adaptable frequency characteristic map.
Figure 2:
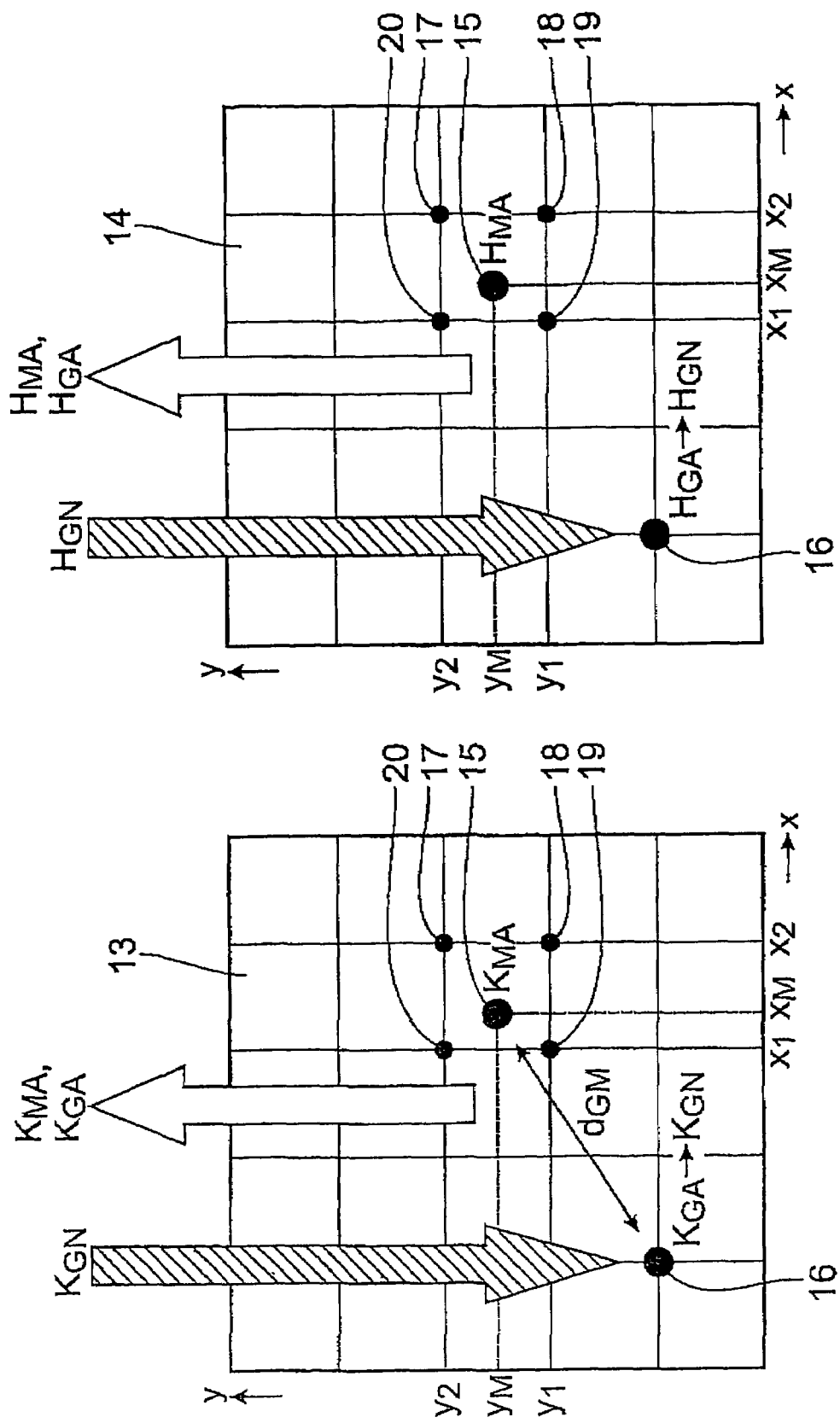
FIG. 2 shows the correction factor characteristic map and the frequency characteristic map which are stored in the characteristic map unit according to FIG. 1, in an enlarged view

Parts which correspond to each other in FIGS. 1 and 2 are assigned the same reference numerals.

FIG. 1 shows an exemplary embodiment of a spontaneously igniting internal combustion engine 1, which comprises four cylinders, 2, 3, 4 and 5 and a shaft 6. The quantity of cylinders is only intended to be shown as an example. Other cylinder quantities are also possible. On the shaft 6, for example the crankshaft, of the internal combustion engine 1, a rotary sensor 7 is attached which comprises equidistant markings distributed over the circumference. These markings, which are not shown in greater detail in the exemplary embodiment, can take the form of teeth or holes. A sensor 8 which is assigned to the rotary sensor 7, for example in the form of an inductive sensor, is connected to a control device 9 which is designed for operating the internal combustion engine 1. The sensor 8 provides a rotational speed signal when one of the markings on the rotary sensor 7 moves past it. This rotational speed signal is fed to the control device 9.

The control device 9 comprises, alongside other units not shown, a rotational speed signal evaluation unit 10, a characteristic map unit 11 and an injection unit 12. In the characteristic map unit 11, a correction factor characteristic map 13 and a frequency characteristic map 14, which are both designed for adaptation during the operation of the internal combustion engine 1, are stored in a memory not shown in greater detail.

The above-mentioned units 10 to 12 of the control device 9 can be physically separated, for example as separate electronic assemblies or also compiled to form a single physical unit. The latter is possible in particular in the case of a program version of the units 10 to 12 on a signal processor. A mixed form is equally possible.

The functioning of the control device 9, in particular, of the characteristic map unit 11, will now be described in greater detail below with reference to FIGS. 1 and 2, together with the resulting procedure for operating the internal combustion engine 1.

From the rotational speed signal delivered by the sensor 8, a current correction factor $K_M$ is determined in the rotational signal evaluation unit 10. The current correction factor $K_M$ is cylinder-specific and is used to precisely determine the starting time point and the quantity of fuel injected into the cylinder 2, ultimately by the injection unit 12. The rotational signal evaluation unit 10 generates for each of the cylinders 2 to 5 a current correction factor $K_M$ of this type. As an example, reference is made only to the current correction factor $K_M$ of the cylinder 2 in FIGS. 1 and 2. The type and nature of its determination is itself already known. One possibility is described in DE 102 35 665 A1.

The current correction factor $K_M$ is an input value of the characteristic map unit 11, to which information regarding a current operating point 15 (=operating condition) of the internal combustion engine 1 can also be fed. In the exemplary embodiment, the operating condition is characterised by a first condition value x, which gives an average load of the internal combustion engine 1, and a second condition value y, which gives an average rotational speed of the internal combustion engine 1. The current operating point 15 is determined via current condition values $x_M$ and $y_M$, which are both already provided in the control device 9 of the internal combustion engine 1.

Based on the above-mentioned input values, the correction factor characteristic map 13 and the frequency characteristic map 14 are adapted at least partially (=updated). Then, with access to the updated correction factor characteristic map 13 an updated correction factor $K_{MN}$ is generated and is supplied to the injection unit 12 as a ruling value for the post-adjustment of the injection into the cylinder 2.

In the following, the adaptation of the correction factor characteristic map 13 and the frequency characteristic map 14 is described in greater detail with reference to FIG. 2. Both characteristic maps 13 and 14 are in each case formed as a grid characteristic map, which comprises a regular. i.e. equidistant distribution of the grid points (=nodes), and based on which a non-linear function or a coherence which cannot be shown analytically can easily be illustrated in a discrete, i.e. scanned form. The scanned, two-dimensional base of the two characteristic maps 13 and 14 is spanned by the two condition values x and y.

Prior to adaptation, in the correction factor characteristic map 13 for discrete operating points, which in each case are determined by a value pair of the condition values x and y which are assigned to a grid point, previous grid correction factors $K_{GA}$ are stored. In the frequency characteristic map 14, prior to adaptation for the same discrete operating points, previous grid frequencies $H_{GA}$, which give measured values which indicate how frequently the related discrete operating condition has occurred to date, are stored.

The correction factor characteristic map 13 which is initially assigned the same unit value in all cases, such as a one, makes it possible to take into account the time variant behavior of the corresponding cylinder 2 which is conditioned by aging effects, whereby the previous grid correction factors $K_{GA}$ are adapted in specifiable time distances. In the exemplary embodiment, these adaptations are conducted continuously, i.e. without interim intervals between two consequent adaptation cycles. In general, two interim intervals are possible with one broadly varying time period.

Grid correction factors which following an adaptation of this nature are stored in the correction factor characteristic map 13 are referred to as updated grid correction factors $K_{GN}$. During an adaptation cycle, both the previous grid correction factors $K_{GA}$ and the previous grid frequencies $H_{GA}$ are preferably adapted together. Accordingly, therefore, grid frequencies which are stored after adaptation in the frequency characteristic map 14 are referred to as updated grid frequencies $H_{GN}$.

During the adaptation of a selected discrete operating point 16, for example, the previous grid correction factor $K_{GA}$ and one correction factor $K_{MA}$ which has been interpolated for the current operating point 15 using certain previous correction factors $K_{GA}$, a frequency $H_{MA}$ of the current operating point 15, the previous grid frequency $H_{GA}$ of the discrete operating point 16 and a distance $d_{GM}$ between the current operating point 15 and the discrete operating point 16 is taken into account. Furthermore, the latter distance $d_{GM}$ can additionally be provided with a multiplicative weighting factor δ in order to control the distant effect of the current correction factor $K_M$ on the previous correction factors $K_{GA}$.

In order to determine the distance $d_{GM}$, in the exemplary embodiment, the Euclidic distance value is used. In general, however, other distance values such as the Manhattan distance value are possible.

As is indicated in FIG. 2 by means of the non-shaded arrows which point outwards, information is taken from the characteristic maps 13 and 14 which relates to the operating points which are actually assigned data, but also to the current operating point 15. The current operating point 15 only coincides with a discrete operating point in exceptional cases, so that the information for the current operating point 15 which can be taken from the data from four adjacent discrete operating points 17, 18, 19 and 20 is interpolated.

In this manner, the interpolated correction factor $K_{MA}$ and the frequency $H_{MA}$ of the current operating point 15 can be determined. The procedure is the same for both values. In each case, an interpolation function f $$f(x,y)=a_1+a_2x+a_3y+a_4xy \quad (1)$$

is used, whereby the interpolation function f represents the correction factor and the frequency. With $a_1$, $a_2$, $a_3$ and $a_4$, constant factors are represented which are initially unknown. Instead of the interpolation function f of equation (1), other interpolation functions can be used.

With the previous grid correction factors $K_{GA}$ or previous grid frequencies $H_{GA}$ which have been stored in the characteristic map 13 or 14 for the four adjacent discrete operating points 17 to 20 as the node values of the interpolation function f and with the condition values $x_1$, $x_2$, $y_1$, $y_2$ which define the adjacent discrete operating points 17 to 20, the following linear equation system results:

$$\begin{bmatrix} f(x_1,y_1) \\ f(x_2,y_1) \\ f(x_1,y_2) \\ f(x_2,y_2) \end{bmatrix} = \begin{bmatrix} 1 & x_1 & y_1 & x_1y_1 \\ 1 & x_2 & y_1 & x_2y_1 \\ 1 & x_1 & y_2 & x_1y_2 \\ 1 & x_2 & y_2 & x_2y_2 \end{bmatrix} \begin{bmatrix} a_1 \\ a_2 \\ a_3 \\ a_4 \end{bmatrix} \quad (2)$$

This linear equation system is solved according to the vector of the unknown factors $a_1$ to $a_4$. Using the factors $a_1$ to $a_4$ determined in this manner, together with the current condition values $x_M$ and $y_M$, the required interpolated correction factor $K_{MA}$ or the required frequency $H_{MA}$ of the current operating point 15 can be determined using the equation (1).

In general, however, this determination can also be achieved without solving a linear equation system, such as described in the equation (2). The distance of the current operating point 15 from the adjacent discrete operating points 17 to 20 is decisive for the interpolated determination of the values which are of interest. For this reason, a transformation of the condition values x and y to transformed condition values u and v can be conducted in such a manner that $x_1$ is mapped to $u_1=0$, $x_2$ to $u_2=1$, $y_1$ to $v_1=0$ and $y_2$ to $v_2=1$. If these transformed condition values $u_1$, $u_2$, $v_1$ and $v_2$ of the discrete operating points 17 to 20 are used in the interpolation function f according to the equation (1), the unknown factors $a_1$ to $a_4$ can be calculated in a simple manner. For the nodes which are taken from the characteristic map 13 or 14 for the four discrete operating points 17 to 20:

$$f(x_1,y_1)=f(u_1,v_1)=f(0,0)$$

$$f(x_2,y_1)=f(u_2,v_1)=f(1,0)$$

$$f(x_1,y_2)=f(u_1,v_2)=f(0,1)$$

$$f(x_2,y_2)=f(u_2,v_2)=f(1,1)$$

the four unknown factors result directly to:

$$a_1=f(0,0)$$

$$a_2=f(1,0)-f(0,0)$$

$$a_3=f(0,1)-f(0,0)$$

$$a_4=f(1,1)+f(0,0)-f(1,0)-f(0,1)$$

A further possibility for determining the interpolated correction factor $K_{MA}$ or the frequency $H_{MA}$ of the current operating point 15 arises when instead of the four adjacent discrete operating points 17 to 20, only three adjacent operating points are selected, which form the corner points of the triangle within which the current operating point 15 is arranged. With this triangular interpolation, an interpolation f is used accordingly, which in contrast to the equation (1) comprises only three unknown factors, so that the complexity of the process for determining the interpolated values is reduced.

Following the determination of the interpolated correction factor $K_{MA}$ and the frequency $H_{MA}$ of the current operating point 15, the previous grid correction factors $K_{GA}$ and the previous grid frequencies $H_{GA}$ are adapted to the respectively corresponding updated grid correction factors $K_{GN}$ or updated grid frequencies $H_{GN}$ using the following equations:

$$K_{GN} = K_{GA} + \frac{H_{MA}}{(1+\delta \cdot d_{GM})H_{GA}}(K_M - K_{MA}) \quad (3)$$

$$H_{GN} = H_{GA} + \frac{1}{(1+\delta \cdot d_{GM})} \quad (4)$$

This adaptation is conducted for all the discrete operating points of the characteristic maps 13 and 14, or at least for those which are within a certain surrounding area of the current operating point 15. The discrete operating point 16 is shown in FIG. 2 as a representative example.

An updated grid frequency $H_{GN}$ which is determined in this manner is submitted to an excess correction. For this purpose, the average value for all updated grid frequencies $H_{GN}$ is initially formed. If this average value is higher than a maximum limit value which should be specified, the difference between the average value and the maximum limit value is formed and is deducted from each of the updated grid frequencies $H_{GN}$, unless the current updated grid frequency $H_{GN}$ would then fall below a lower limit value, which should also be specified. Other excess corrections are also possible.

The procedure described has the effect that those discrete operating points which are located far away from the current operating point 15 are less influenced than those discrete operating points 20 which are more closely located. Furthermore, frequently occurring information is incorporated into the adaptation with a greater weighting; in other words, the more frequently the corresponding operating point has occurred to date, the more reliable this information is. In addition, the distant effect described guarantees that operating points which only occur rarely, or which do not occur at all, are also subjected to an adaptation to a changed behavior in the internal combustion engine 1.

Following the adaptation of the correction factor characteristic map 13, the updated correction factor $K_{MN}$ is determined for the current operating point 15 using the equations (1) and (2), and is supplied as the input value to the following injection unit 12.

The invention claimed is:

1. A procedure for operating an internal combustion engine (1) with several cylinders (2, 3, 4, 5) into which fuel is injected, in which
   a) for a current operating point (15) which is preferably defined by two condition values ($x_M$, $y_M$) of the internal combustion engine (1), in particular using a measured rotational speed signal from a shaft (6) of the internal combustion engine (1), a current correction factor ($K_M$) for the injection into one of the cylinders (2, 3, 4, 5) is determined,
   characterized in that
   b) using the current correction factor ($K_M$), at least some of the grid correction factors ($K_{GA}$) which are stored in a correction factor characteristic map (13) for discrete operating points (16) of the internal combustion engine (1) are adapted, whereby
   c) a distance ($d_{GM}$) between the current operating point (15) and the discrete operating point (16) of the current grid correction factor ($K_{GA}$) to be adapted is taken into account when the grid correction factors ($K_{GA}$) are adapted
   d) using updated grid correction factors ($K_{GN}$) which are stored following adaptation in the correction factor characteristic map (13), an updated correction factor ($K_{MN}$) for the current operating point (15) is determined, and the updated correction factor ($K_{MN}$) is used for the injection, and
   e) during the adaptation of the grid correction factors ($K_{GA}$), a frequency ($H_{MA}$) of the current operating point (15) and a grid frequency ($H_{GA}$), which is stored in a discrete frequency characteristic map (14), of the discrete operating point (16) of the respective grid correction factor ($K_{GA}$) which is currently to be adapted, are taken into account.

2. A procedure according to claim 1, characterized in that for the current operating point (15), using the grid correction factors ($K_{GA}$) of the discrete operating points (17, 18, 19, 20) which are adjacent to the current operating point (15), an interpolated correction factor ($K_{MA}$) is determined and is taken into account during the adaptation of the grid correction factors ($K_{GA}$), in particular in the form of a difference between the current correction factor ($K_M$) and the interpolated correction factor ($K_{MA}$).

3. A procedure according to claim 1, characterized in that the frequency ($H_{MA}$) of the current operating point (15) is interpolated using the grid frequencies ($H_{GA}$) of the discrete operating points (17, 18, 19, 20) which are adjacent to the current operating point (15).

4. A procedure according to claim 1, characterized in that the grid frequencies ($H_{GA}$) of each of the discrete operating points (16) are adapted in a same adaptation cycle as the grid correction factors ($K_{GA}$).

5. A procedure according to claim 4, characterized in that following the adaptation, updated grid frequencies ($H_{GN}$) which are present are subjected to an excess correction.

6. A procedure according to claim 1, characterized in that the grid correction factors ($K_{GA}$) are initially pre-assigned with a uniform value.

7. A procedure according to claim 1, characterized in that the distance ($d_{GM}$) between the current operating point (15) and the discrete operating point (16) of the grid correction factor ($K_{GA}$) currently to be adapted is weighted, in particular using a multiplicative weighting factor ($\delta$).

8. A procedure according to claim 1, characterized in that the grid correction factor ($K_{GA}$) of each respective discrete operating point (16) is adapted according to the following equation:

$$K_{GN} = K_{GA} + \frac{H_{MA}}{(1+\delta \cdot d_{GM})H_{GA}}(K_M - K_{MA})$$

whereby $K_{GN}$ represents an updated grid correction factor of the current discrete operating point (16), $K_{GA}$ represents a previous grid correction factor of each operating point (16) which is stored in the correction factor characteristic map (13) prior to adaptation, $H_{MA}$ represents a frequency of the current operating point (15), $H_{GA}$ represents a previous grid frequency of each respective discrete operating point (16) which is stored in the discrete frequency characteristic map (14) prior to adaptation, $d_{GM}$ represents the distance between the current operating point (15) and each respective discrete operating point (16), $\delta$ represents a weighting factor, $K_M$ represents the current correction factor and $K_{MA}$ represents an interpolated correction factor.

9. A procedure according to claim 8, characterized in that the previous grid frequency ($H_{GA}$) of each respective discrete operating point (16) is adapted according to the following equation:

$$H_{GN} = H_{GA} + \frac{1}{(1+\delta \cdot d_{GM})}$$

whereby $H_{GN}$ represents an updated grid frequency of each respective discrete operating point (16).

10. A procedure for operating an internal combustion engine (1) with several cylinders (2, 3, 4, 5) into which fuel is injected, in which
   a) for a current operating point (15) which is preferably defined by two condition values ($x_M$, $y_M$) of the internal combustion engine (1), in particular using a measured rotational speed signal from a shaft (6) of the internal combustion engine (1), a current correction factor ($K_M$) for the injection into one of the cylinders (2, 3, 4, 5) is determined,
   characterized in that
   b) using the current correction factor ($K_M$), at least some of the grid correction factors ($K_{GA}$) which are stored in a correction factor characteristic map (13) for discrete operating points (16) of the internal combustion engine (1) are adapted, whereby
   c) a distance ($d_{GM}$) between the current operating point (15) and the discrete operating point (16) of the current grid correction factor ($K_{GA}$) to be adapted is taken into account when the grid correction factors ($K_{GA}$) are adapted
   d) using updated grid correction factors ($K_{GN}$) which are stored following adaptation in the correction factor characteristic map (13), an updated correction factor ($K_{MN}$) for the current operating point (15) is determined, and the updated correction factor ($K_{MN}$) is used for the injection, and
   further characterized in that the grid correction factor ($K_{GA}$) of each respective discrete operating point (16) is adapted according to the following equation:

$$K_{GN} = K_{GA} + \frac{H_{MA}}{(1+\delta \cdot d_{GM})H_{GA}}(K_M - K_{MA})$$

whereby $K_{GN}$ represents an updated grid correction factor of the current discrete operating point (16), $K_{GA}$ represents a previous grid correction factor of each operating point (16) which is stored in the correction factor characteristic map (13) prior to adaptation, $H_{MA}$ represents a frequency of the current operating point (15), $H_{GA}$ represents a previous grid frequency of each respective discrete operating point (16) which is stored in the discrete frequency characteristic map (14) prior to adaptation, $d_{GM}$ represents the distance between the current operating point (15) and each respective discrete operating point (16), $\delta$ represents a weighting factor, $K_M$ represents the current correction factor and $K_{MA}$ represents an interpolated correction factor.

11. A procedure according to claim 10, characterized in that the previous grid frequency ($H_{GA}$) of each respective discrete operating point (16) is adapted according to the following equation:

$$H_{GN} = H_{GA} + \frac{1}{(1+\delta \cdot d_{GM})}$$

whereby $H_{GN}$ represents an updated grid frequency of each respective discrete operating point (16).

\* \* \* \* \*